Jan. 7, 1969 W. J. MAHONEY 3,421,152

LINEAR SELECT MAGNETIC MEMORY SYSTEM AND CONTROLS THEREFOR

Filed March 23, 1964 Sheet 1 of 8

INVENTOR
WILLIAM J. MAHONEY
BY [signature]
ATTORNEY

INVENTOR
WILLIAM J. MAHONEY
BY
ATTORNEY

INVENTOR
WILLIAM J. MAHONEY
BY
ATTORNEY

INVENTOR
WILLIAM J. MAHONEY
BY [signature]
ATTORNEY

INVENTOR
WILLIAM J. MAHONEY
BY
ATTORNEY

INVENTOR
WILLIAM J. MAHONEY
BY
ATTORNEY

INVENTOR
WILLIAM J. MAHONEY
BY
ATTORNEY

INVENTOR
WILLIAM J. MAHONEY
BY
[signature]
ATTORNEY

3,421,152
LINEAR SELECT MAGNETIC MEMORY SYSTEM AND CONTROLS THEREFOR

William J. Mahoney, Darien, Conn., assignor to American Machine & Foundry Company, a corporation of New Jersey Filed Mar. 23, 1964, Ser. No. 353,975
U.S. Cl. 340—174 13 Claims
Int. Cl. G11b *5/00*

ABSTRACT OF THE DISCLOSURE

This invention relates to a linear selection write-read magnetic core matrix having two conductors through each core one of which is a time-shared read-write conductor coupled to receive read and write signals wherein during the write mode; that is for a core to change its magnetic state, both windings must carry cooperative currents; and, during the read mode, current is applied to only one of the windings.

This invention relates to magnetic memory systems and particularly to linear selection magnetic memory systems and to the circuits used therein for selectively writing digital information into a magnetic core memory matrix for storage therein and reading out the stored information at desired intervals at a given rate.

A linear selection system, also called a word access, word organized or direct selection system, as described in Chapter 4 of the book entitled, "Square-Loop Ferrite Circuitry," by C. J. Quartly, 1962 (Prentice-Hall, Inc.), is characterized by the fact that the gating or selection function is entirely removed from the storage matrix for reading. As stated in effect in this book, the selection function is retained for writing but with less exacting requirements placed on the cores' performance than in the coincident drive system in that the latter requires more stringent requirements on the squareness of the cores and on the drive pulses in order to prevent information being partly erased or inserted by the half current pulses used for reading and writing. The magnetic cores are arranged in rows and columns in the storage matrix, and each word address location has its own read drive wire so that a pulse on one of these wires is applied only to the cores in the address from which information is to be extracted. The cores are driven to saturation in the "0" state by the read pulses so that any core which was storing a "1" will provide a larger output than one which was storing a "0." After reading, all cores in the selected word are left in the "0" state so that during the writing process they are required to be either left in this state or switched to the "1" state depending upon the information to be stored.

A general object is to improve such linear selection magnetic memory systems and the techniques for operating them.

A more specific object is to control a magnetic core matrix consisting of a two-dimensional array of magnetic cores in a linear selection system in such manner as to provide writing of binary word information for storage therein and readout of the stored information with economy of apparatus, low cost and improved noise discrimination.

Another object is to store binary information in a magnetic core matrix of a linear selection magnetic memory write-read system in such manner that the stored information is not destroyed by the readout operation, or is destroyed upon command before the next write-in operation.

Another object is to expand the storage capability of a linear selection memory system by the use of a minimum amount of additional apparatus in each plane of the memory matrix.

Another object is to provide for independent writing in and reading out of binary word information in a word organized array of magnetic cores with a minimum of control apparatus.

Another object is to provide a word organized memory array in which the sense read amplifiers are unaffected by the write pulses transmitted on the same line and blocking of these amplifiers by the write information during the read operation is prevented.

The linear selection memory system in accordance with the invention employs only two wires in the core plane of the memory matrix, utilizing a time-shared X read-write wire, which may be referred to as a "common sense" line. On the Y selection line, a full read, followed by one-half write current is passed on the line under control of a bipolar pulse generator, selection of the required Y lines being made by bi-directional switches at the top and bottom of the Y lines.

The read selection is obtained by external logic, and in the past this has placed a high burden on the logic and necessitated a very large amount of logic control apparatus. In linear select, a two-dimensional array of magnetic cores in the memory matrix is used, and the number of cores in the Y plane equals the number of binary bits to the word, so that the Y plane is inherently limited to some reasonable size, such as 16, 24, 32, 64 cores. The number of words in the memory can be high, 4094, 9188, etc., and as selection of these words is external to the plane, one driving system has been provided for every word line. The logic control arrangements chosen for this linear selection system are similar to those used in connection with a coincident current storage system described in an article by G. C. Padwick et al. in Proc. Inst. Elec. Engrs. (London) 1959, but have not been previously used in connection with linear select systems.

A feature of the present invention is the use of one memory matrix and an additional bi-directional switch to expand the memory for every plane of a given number of lines.

The linear select memory system of the invention was designed for medium speed (10 μs.) operations and provides for considerable economy of apparatus, costing less than comparable three-dimensional coincident current systems, and with significantly improved noise discrimination.

Other objects and features of the invention will be brought out in the following detailed description thereof in connection with the various figures of the accompanying drawings in which.

Figure 1:
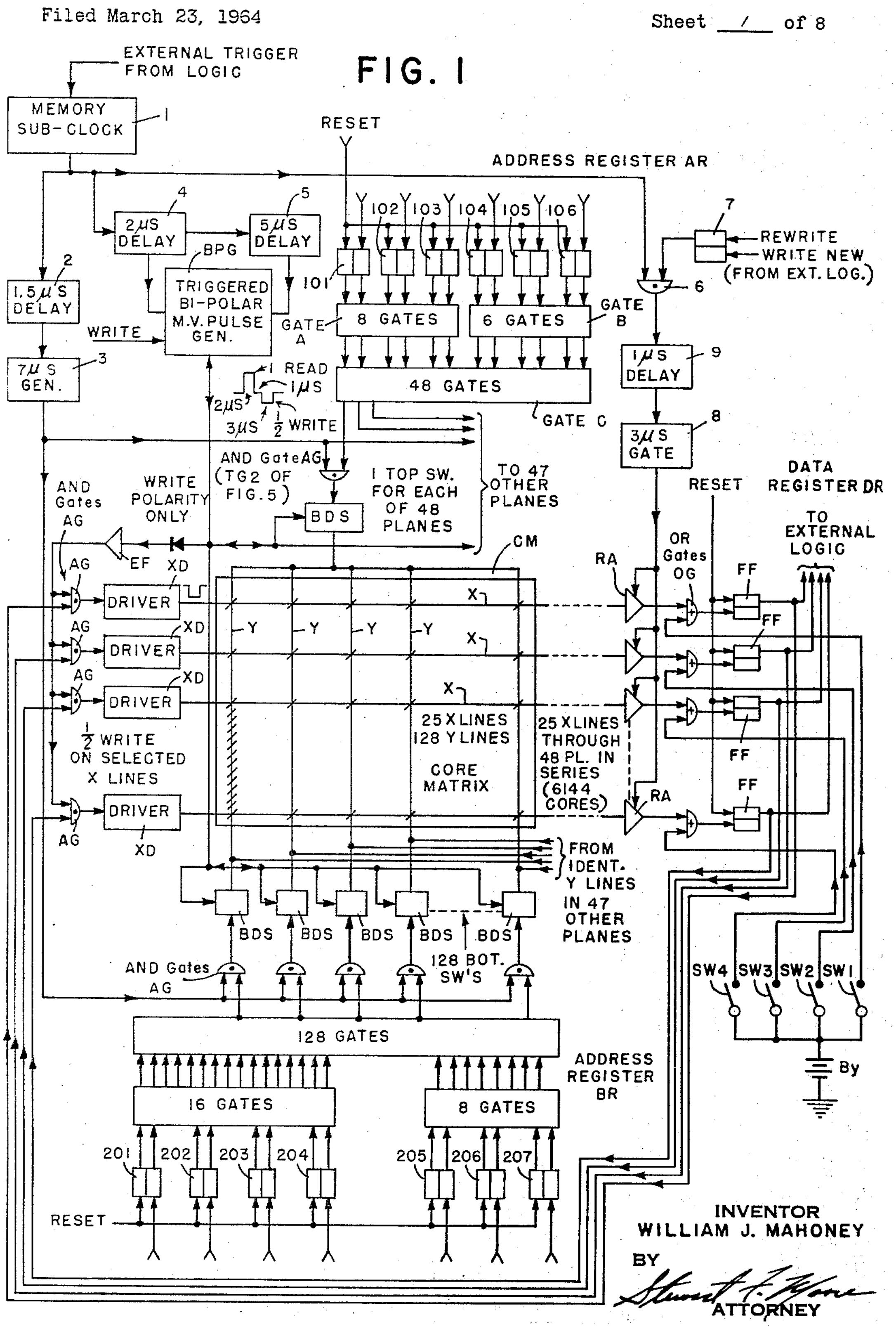
FIG. 1 shows a block diagram of one embodiment of a linear select memory system in accordance with the invention.
Figure 2:
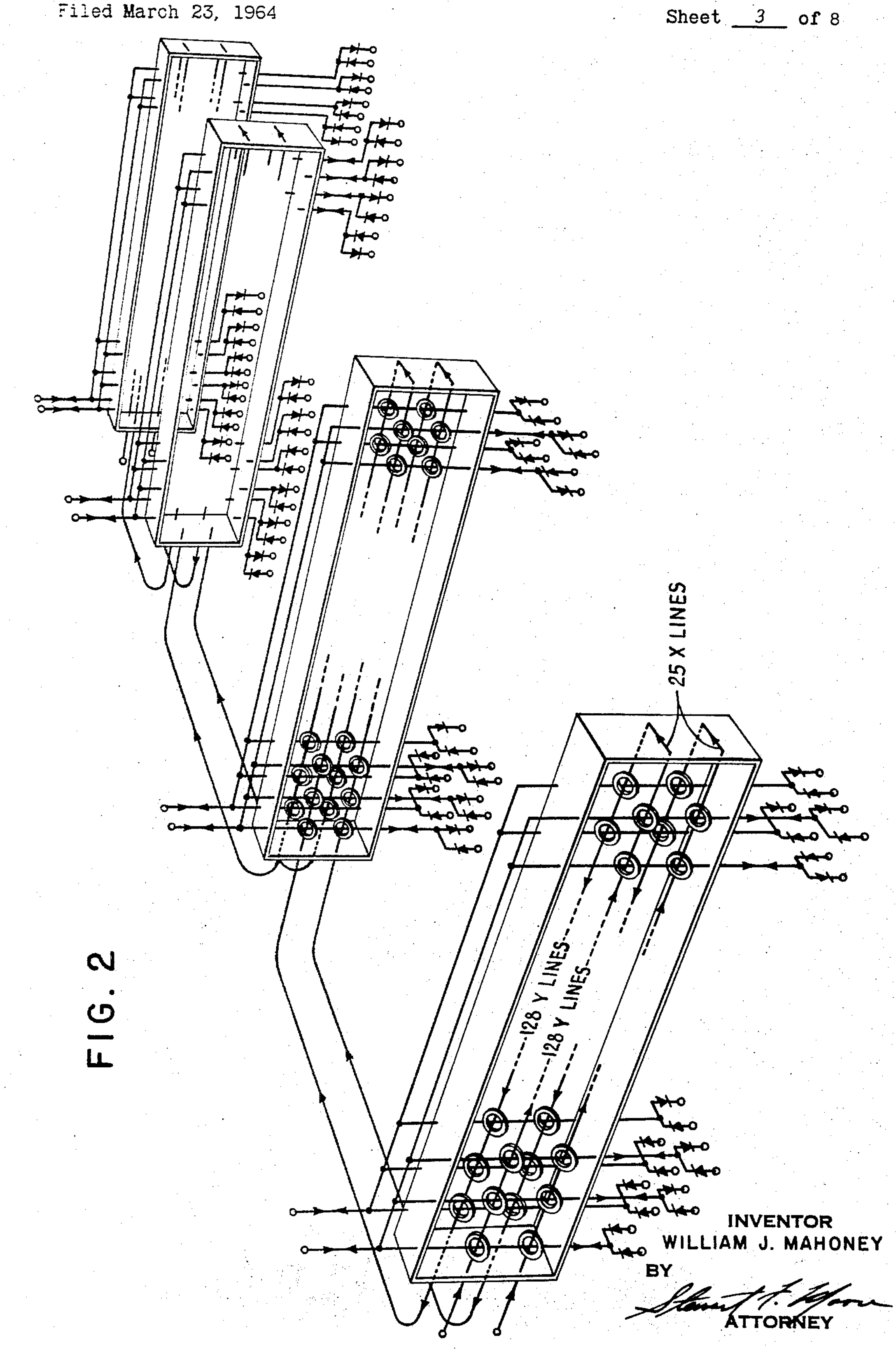
FIG. 2 shows a wiring diagram of a 24-plane, two-dimensional memory stack of magnetic cores used in the system of FIG. 1.
Figure 3:
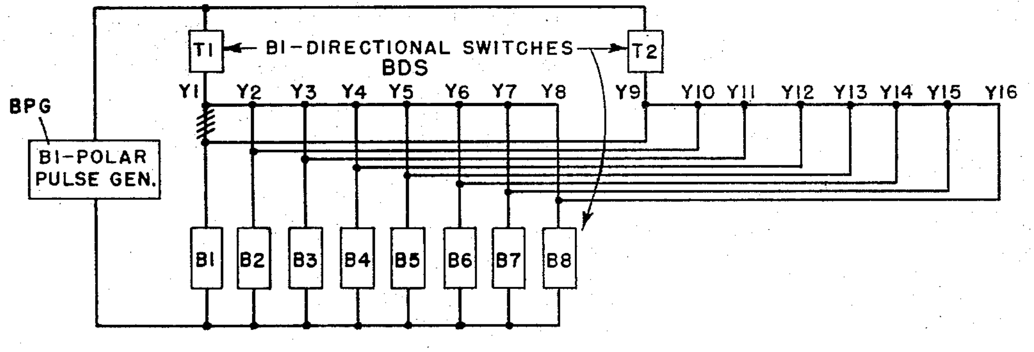
Figure 4:
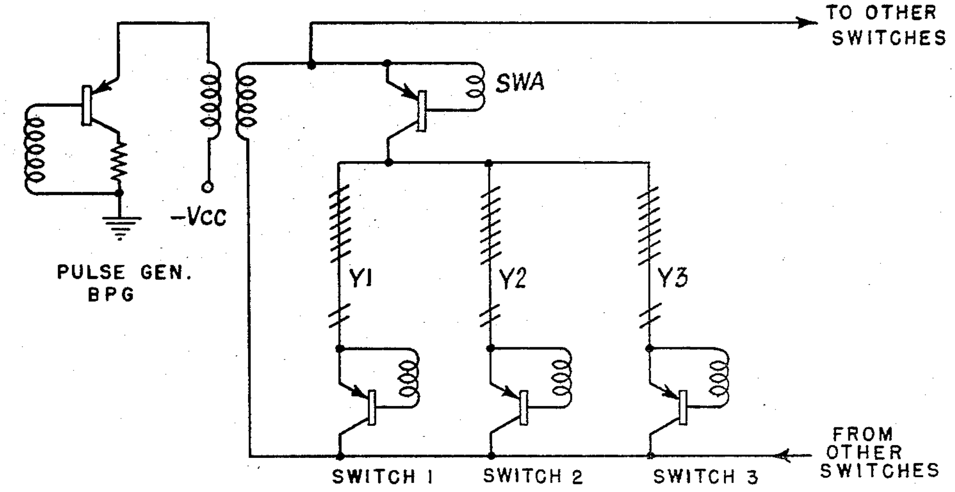
Figure 5:
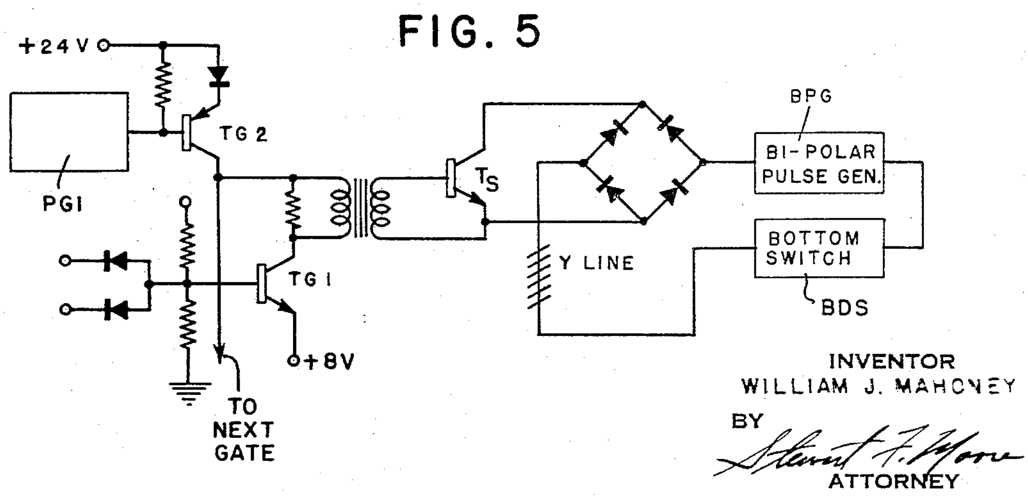
Figure 6:
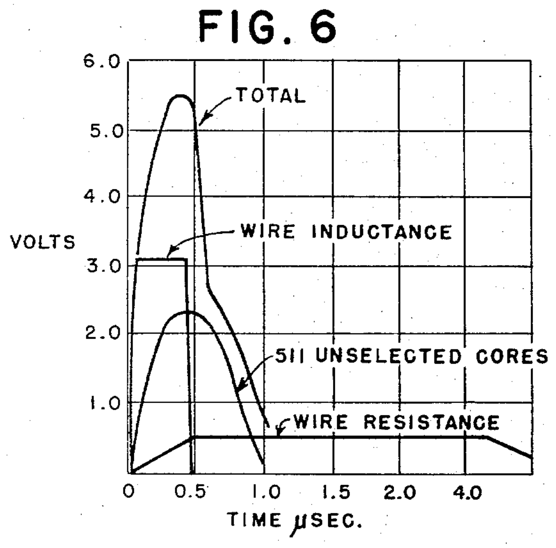
Figure 7:
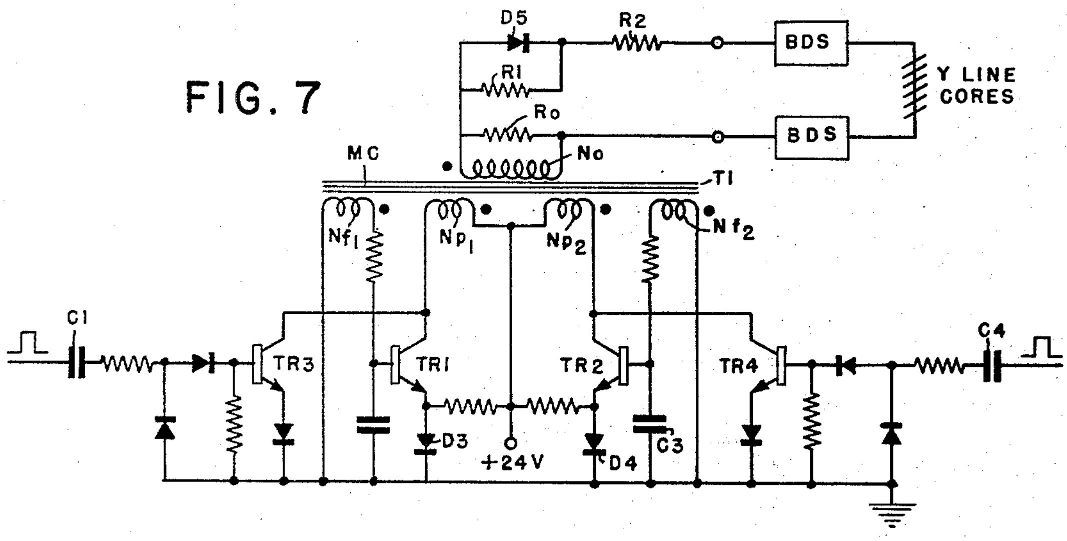
Figure 8:
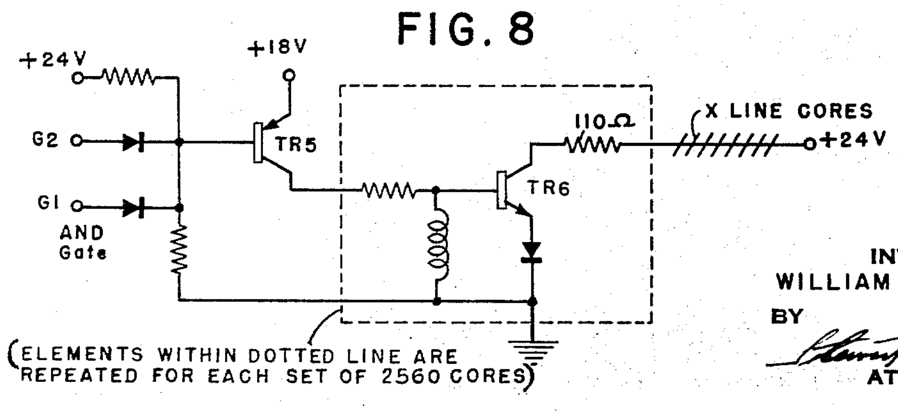
Figure 9:
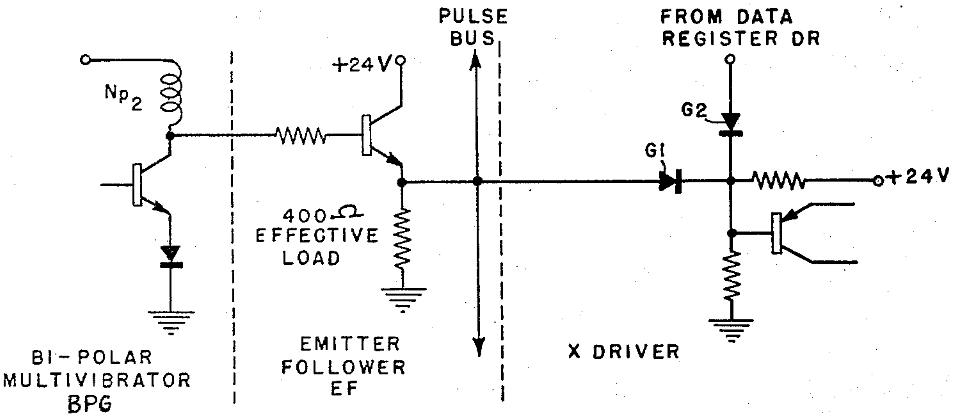
Figure 10:
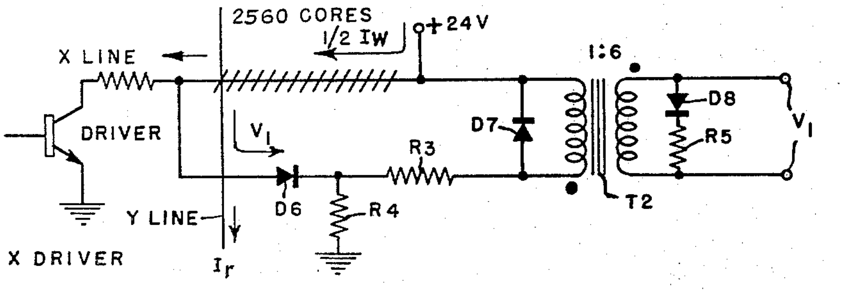
Figure 11:
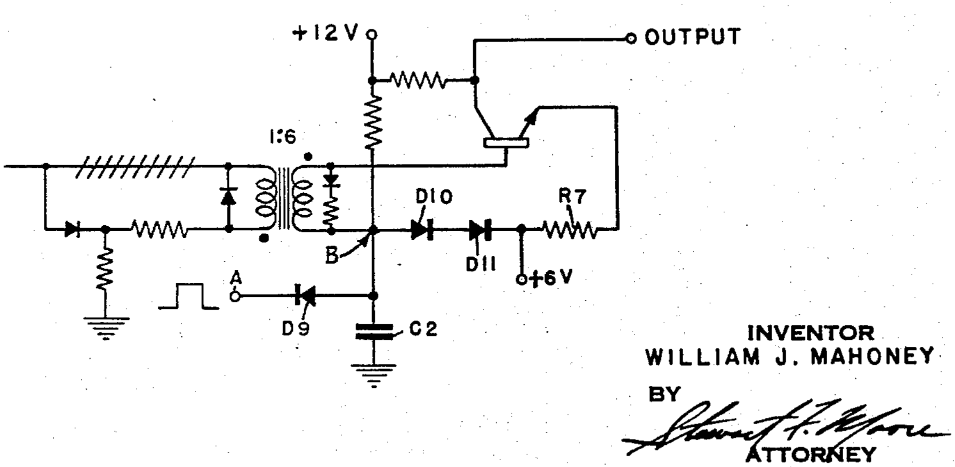
Figures 12, 14:
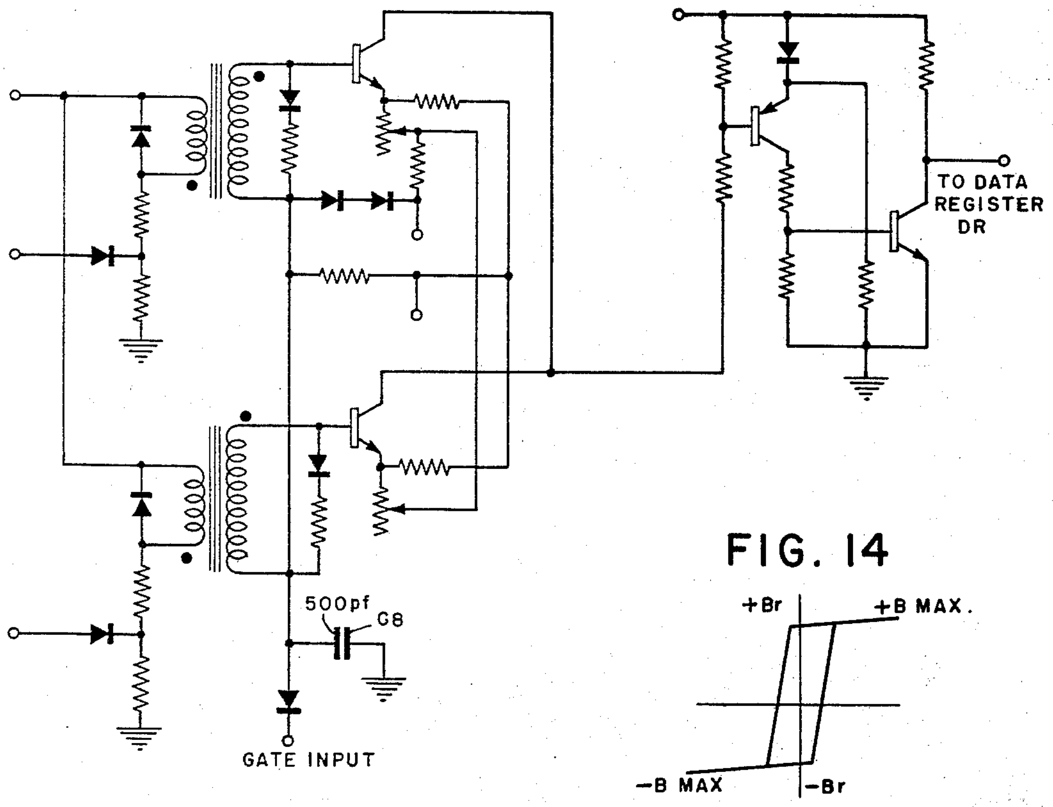
Figure 17:
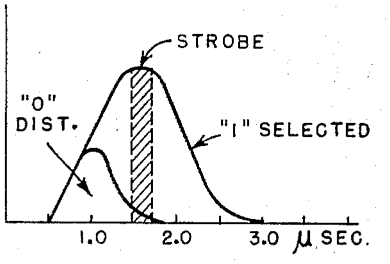
Figure 18:
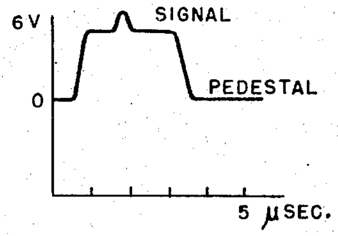
Figure 19:
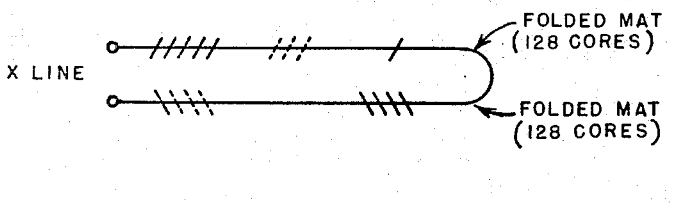

FIGS. 3 and 4 respectively show in block and simplified schematic form the Y-line selection system used in the system of FIG. 1;

FIG. 5 shows a schematic circuit, partially in block form, of the bi-directional switching and associated apparatus used in the system in FIG. 1;

FIG. 6 shows voltage-time curves of the load represented by the cores of the X lines of the core matrix of FIG. 2;

FIG. 7 shows a schematic circuit diagram of the bipolar pulse generator and associated apparatus in block form used in the system of FIG. 1;

FIG. 8 shows a simplified circuit diagram of the X driver and the associated gating arrangement and X-line cores of the core memory matrix in diagrammatic form, used in the system of FIG. 1;

FIG. 9 shows a simplified schematic circuit diagram of the emitter follower and the associated bipolar pulse generator and X-driver arrangements used in the system of FIG. 1;

FIG. 10 shows schematically the arrangement used for coupling an X driver and a read amplifier to each X line of the memory core matrix in accordance with the invention, used in the system of FIG. 1;

FIGS. 11 and 12 respectively show schematically a portion of the input and the complete circuit of each read amplifier used in the system of FIG. 1;

FIGS. 13 to 18, inclusive, show curves used in connection with the description of operation of the circuits shown in the preceding figures and associated apparatus to accomplish the objects of the invention; and FIG. 19 shows an arrangement which may be used in the system of FIG. 1 to cancel noise from the wire inductance of each X line of the memory core matrix so as to achieve better signal-to-noise discrimination.

The core matrix CM used in the system of FIG. 1, as shown in FIG. 2, comprises a 24-plane memory stack of two-dimensional storage arrays of toroidal magnetic cores having substantially rectangular hysteresis characteristics arranged in rows and columns, to be referred to hereinafter as the X and Y plane lines, respectively, consisting of 25 X lines and 128 Y lines through 48 planes in series (6144 cores). The cores are provided with X windings each common to all cores of a row and with Y windings common to all the cores of a column. The X and Y windings as shown are provided respectively by a single wire threaded through the cores. All cores in each row may represent different bits of the same word. The memory operates in a well known manner according to the coincidence principle in the write mode; that is, for a core to change its magnetic state both one X winding and one Y winding must carry cooperative currents. In the read mode, current is applied only to the vertical Y conductors.

The circuits for controlling the core matrix CM as shown in FIGS. 1 and 2 will first be described in connection with the other figures.

*Y selection*

On the Y selection line a full read current of one polarity, followed by one-half write current of the opposite polarity, is passed on the line. ("Full" here means the unit of current required to switch the core fully from one state of saturation to the other.) Selection of the line is made by bi-directional switches (BDS) at both the top and bottom of the Y line, as in FIG. 3. For example, closure of top switch T1 and bottom switch B1 will select line Y1; closure of top switch T2 and bottom switch B3 will select line Y11, etc.

FIG. 5 shows the circuit of each bi-directional switch used at the top and bottom of the Y lines. This switch is a known diode bridge with the transistor $T_s$ in the center connected across one bridge diagonal. The bridge converts the bipolar pulse supplied to one input thereof by the bipolar pulse generator BPG of FIG. 7 to uni-polar pulses for passage through the transistor $T_S$.

Figure 13:
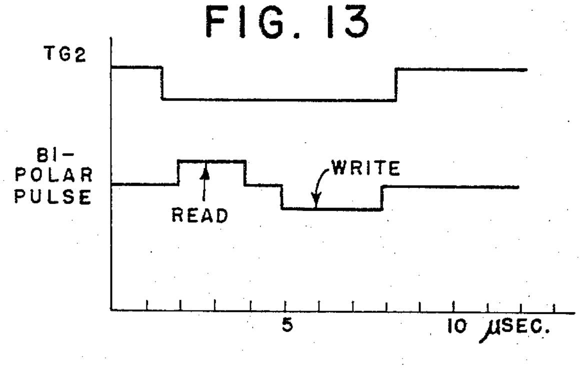

Two input transistor gates TG1 and TG2 must be closed for the bridge selection. TG1 is the DC gate and one of these is used for every switch. TG2 is a pulse gate which is common to all the bridges. The memory clocking system (sub-clock 1 of FIG. 1) turns on the pulse generator RG1 one and one-half microsecond before the pulse is produced from the bipolar generator BPG, and this pulse generator PG1 (FIG. 5) holds TG2 in conduction for about 7 microseconds, thus conditioning the input of the selected switch to pass the bipolar pulse. The switch timing sequence is shown in FIG. 13, in which the conduction period of gate TG2 is seen to straddle the bipolar pulse generated by BPG.

Selection of the gate TG1 is achieved by standard diode gating methods, which will be described later in connection with FIG. 1, one gating system being used for the top and one for the bottom bi-directional switch sets (BDS).

The number and distribution of the top and bottom switches (BDS) is determined by the logic breakdown of the system. As an example, 48 planes of 128 cores as shown in FIG. 2 give 6,144 words; 128 bottom switches are common to all planes and one top switch is used for each plane, making 176 total switches.

As the memory is expanded only one additional top switch BDS is required for every plane of 128 lines. Thus, an easily expandable memory with little additional control apparatus is practical, in comparison to that of the 3-dimensional coincident current array. An upper limit would be reached where diode and transistor leakage currents, and junction capacities rob the drive current to below a workable level. However, as fast-recovery silicon devices may be used for these switching elements, the limit is relatively high.

The switching of the pulse generated by the circuit of FIG. 7 is handled by the circuit shown in FIG. 4 where switch SWA is the transistor diagonal to the rectifier bridge of FIG. 5, indicated as $T_S$ therein. As shown in FIG. 4, selection of the required Y line will be by saturated operation of the appropriate top and bottom transistor bi-directional switches BDS (here identified as top switch SWA and bottom transistor switches 1, 2, or 3). As described later in connection with FIG. 1, these switching transistors must conduct about 1 microsecond before arrival of the controlling pulse and this conduction will continue for about the same time after the cessation of the pulse. Heavy base drive for the transistor switches in the order of 100 ma. must be used to ensure that carrier transit time does not pull the transistor out of saturation when the pulse appears at the transistor collector junction.

The circuit schematic of the bipolar pulse generator BPG is shown in FIG. 7. It is a magnetic transistor multivibrator, in which a square loop magnetic core in transformer T1 is used to achieve timing and to minimize the flyback effect on the drive lines when the current pulse terminates. As the rectifier bridge arrangement is bipolar, the flyback voltage could partially reverse the cores. The multivibrator is monostable, both sides being triggered by positive pulses, as shown. The multivibrator includes four transistors TR1, TR2, TR3 and TR4. At rest (no positive pulses applied), none of these transistors are conducting. The positive trigger applied through capacitor C1 and the resistor and diode in series therewith to the base of transistor TR3 starts that transistor into conduction. However, at the beginning of the resulting current flow through the winding $N_{p1}$ of transformer T1, connected to the collector of TR3, a feedback voltage is induced by the magnetic core MC of that transformer in the winding $N_{f1}$, which is of a polarity and amplitude such as to generate base drive in transistor TR1. In the manner of such circuits, when the core MC of the transformer T1 is driven to saturation, the feedback voltage ceases. The time interval is established from the known transformer formula $$\frac{1}{T}=\frac{E\times 10^{-8}}{4N_pB_{\mathrm{sat}\ x^2}}$$

and is set at 2 microseconds. A square output pulse is induced by the magnetic core MC into the output winding N0 of transformer T1, positive at the dot. The output of the winding N0 shunted by the resistor R0 passes through the diode D5 shunted by the resistor R1. Therefore, the full output voltage (less than the diode drop of D5) appears across the resistor R2, the two bi-directional switches BDS and the cores in the associated Y line as shown.

When the selected BDS switches are conditioned to conduct, the cores in the Y line are subjected to read current from the output of transformer T1. A fixed voltage drop of about 4 volts appears across each selected BDS. The memory core line has a drop of from 0.125 to 1.0 volt depending upon the number of selected 1's. The current is limited by the output voltage (less the above voltage drops) and the resistance value of R2. This "read" current is set to a value about 1.2 to 1.5 times greater than required in order to fully switch the magnetic state of the cores in the core matrix CM. This overdrives provides a higher output voltage from the core. (As an example, the RCA 226 M1 core used in the matrix CM will give 60 mv. for a fully 325 ma. drive and 100 mv. for 375 ma. drive.) As the coincident current (½ current on X and Y) technique is not used in read mode, this overdrive is feasible.

At the end of the first read pulse, the transistor TR1 is shut off by the fact that the square loop core MC enters the saturation area and has low permeability. The collector current of TR1 ceases and the core falls from a voltage of $B_{max.}$ to $B_r$ as indicated in the hysteresis representation in FIG. 14.

As the core falls back to $B_r$, a voltage would be induced in the input circuit of TR2 of a polarity to turn this transistor "on." However, the stabistor diode D4 in series with the emitter of TR2 provides a bias threshold which the fall-back voltage does not exceed (capacitor C3 helps to integrate this voltage and reduce its amplitude somewhat). Accordingly, transistor TR2 does not conduct until an input pulse arrives at the capacitor C4. When this pulse is commanded to arrive, $TR_4$ starts conduction drawing current through the winding $N_{p2}$ of transformer T1. The regenerated feedback in winding $N_{f2}$ drives TR2 into full conduction and, although the capacitor C4 becomes fully charged in 1 $\mu$s. halting condutcion in TR4, the transistor TR2 continues in conduction until negative core saturation is reached and the voltage in winding $N_{f2}$ collapses. The polarity of the output voltage in output winding N0 is not negative at the dot. The diode D5 is back-biased and the output current is limited by both resistors R1 and R2 in series. These resistors hold the current to a value of ½ of the matrix memory core switching value. This is now the ½ write current (of opposite polarity to the read current) and travels on the Y line (as described later in connection with FIG. 1). The other half write current is provided by the selected X driver, to be later discussed. When the pulse terminates by the mechanism of the square loop core MC running to saturation, the read-write cycle is completed. Transistor TR1 is not caused to turn "on" by the back EMF of the core at the end of the read pulse as the bias provided by the stabistor diode D3 in series therewith is not exceeded.

A beneficial feature of the linear select system is that the total write pulse amplitude may be allowed to vary between ⅔ and 1 unit, which may be defined as the amount required to switch the cores from one saturated state to the other. This is because the high signal-to-noise ratio on read relaxes the requirement for fully resetting the core during write. Therefore, the current tolerances on each axis driver are relatively large, and variations of such parameters as transistor and diode saturation voltage drops in the bi-directional switches become unimportant.

*X driver*

The maximum length of core line that can be conveniently driven with one X switch amplifier shown in FIG. 8 is determined by the following factors:

In the linear select system, writing is accomplished by coincidence current. Only one Y line is energized with half select current, together with the required X drivers. Therefore, only one core on an X line is ever selected, all other cores being unselected. The impedance of the X line is therefore made up of *n* cores in saturation, wire inductance and wire resistance. The nature of the load is seen by the voltage curves of FIG. 6.

The X lines are not subject to a bipolar drive for reading. Reading is accomplished by a full amplitude (or greater) pulse on the Y line only. Therefore, these switches are not required to have bilateral ability. The saturated switch transistor does not recognize the changing character of the load impedance as long as it is maintaining saturation during the heaviest portion of the current, when wire resistance is the only component of the impedance. The consideration of how many cores can be driven in series then resolves around the voltage required to drive *n* half select cores, and *n* will be determined by the conservative stand-off voltage capability of the switching transistor when it is nonconducting.

From FIG. 6, it is seen that 512 cores require a driving voltage of about 5.5 volts; therefore, it may be assumed that at least 5 groups of 512 cores may be strung in series for switching by one silicon transistor the rating of which is 60 volts.

Figure 15:
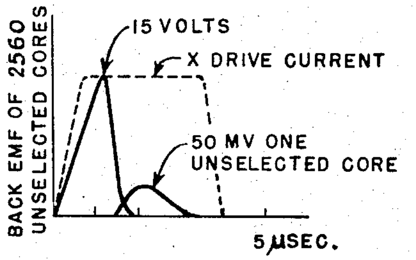

For 2,560 unselected cores the total back EMF is 15 volts, as shown in FIG. 15. If the impressed voltage is 24 volts, with a series resistance which limits the current to ½ write *after* the unselected EMF ceases, the one selected core will be switched, providing the drive current time exceeds both the unselected and selected switching time together. It is therefore desirable that one output switch transistor be used for each array of approximately 2560 cores. (A second reason for restricting the number of X line cores to 2,560 will be treated under the section on the Read Amplifier.)

As the output of this drive must be simultaneous with the write pulse from the bipolar multivibrator, one input of the input AND gate (G1) of FIG. 8 is taken from an emitter follower EF which reproduces the write waveshape of the output of the bipolar multivibrator BPG. This follower is capable of gating 25 drive amplifiers in parallel and is shown in FIG. 9.

The second input to the X driver is fed through diode gate G2 from the data register DR (FIG. 1) which is driven by the read-out amplifier RA on the same X line. When a "1" is read from the X line, the data register flip-flop is set and an enabling level is given to G2, thus conditioning the X driver to respond to the write pulse from the bipolar pulse generator BPG and thereby pass ½ current back to the X line and restore the "1" into the selected core.

*Read amplifier*

This memory system utilizes a single X wire to both read and write. The reading amplifier must respond to a 50 mv. "1" signal and still not be swamped by the ½ write current which is introduced on the same wire a few microseconds later. Swamping would cause the amplifier to be too slow of recovery to respond to write signals which follow within 2 microseconds, as in the case of repetitive operation when searching for unoccupied storage space. The method of coupling to the X line to permit both read and write on one wire is shown in FIG. 10.

When the Y line is transmitting the read pulse $I_r$, the selected core (if a "1") will produce a 50 mv. output pulse $V_1$ as shown by the arrow. This will be in the direction to pass through diode D6. However, by itself it is not of sufficient amplitude to overcome the barrier potential of D6. A pre-bias is therefore established upon D6 by means of R4. R3 is included so that a voltage drop can be provided by the current through R3, R4 in order that the cathode of D6 can be made negative with respect to its anode. Sufficient voltage is provided across R3 to exceed the barrier potential of D6 and cause forward conduction. As D6 is preferably silicon, approximately 0.8 volt is needed across R3. R3 must be sufficiently small in relation to the AC impedance of the primary of pulse transformer T2, so that little signal voltage is lost across this resistor. A value of 30Ω is satisfactory. In order for 0.8 volt to appear across 30 ohms, the DC bleeder must be 27 mils. A 1,000Ω resistor for R4 provides approximately this current from the 24-volt supply.

Figure 16:
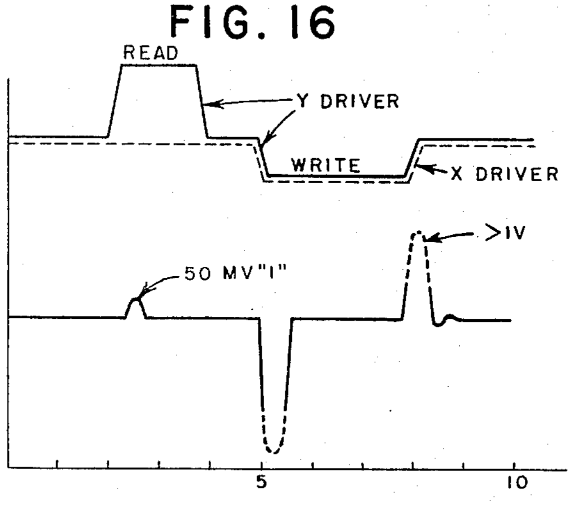

In the write cycle, when the X driver is conducting, D6 will drop to the 0.8 volt of R3, then become reverse biased. Regardless of the amplitude of the X drive voltage pulse, the reading pulse transformer T2 will only see the initial 0.8 volt drop. This voltage, however, is 16 times greater than the 50 mv. "1" signal. Although the voltage itself is in the opposite polarity from the read "1" signal, at the cessation of the write pulse the stored energy in both the cores and the pulse transformer may cause a large flyback voltage at the secondary of pulse transformer T2. A large primary inductance will cause a flyback that not only reaches 2 volts, but may last for 4 to 8 microseconds after the end of the write pulse. In order to minimize this time and amplitude, the pulse transformer T2. A large primary inductance will primary inductance to support the 2 μs. "1" signal from the memory line. FIG. 16 shows the nature of the voltage across the pulse transformer secondary for the read-write cycle.

The large spike occurring at the end of the write current (post-write disturb) is in the same polarity as the read pulse, and, if introduced into the amplifying system, would heavily saturate the stages, causing insensitivity to an immediately recurring read-write cycle. It is seen that proper design of the input transformer T2 will allow that unit to recover satisfactorily in 2 microseconds.

Diode D7 across the primary transformer T2 is included to clamp the flyback voltage from the core line at 0.7 volt. Excitation of the pulse transformer is thereby limited. A clamp consisting of D8, R5 across the secondary of T2 holds the transformed flyback voltage to $<3$ volts, a value that at the time of writing is insufficient to cause conduction in the reading amplifier, as will be explained in the following discussion of the read amplifier.

*Signal-to-noise reading problems*

Before taking up the design of the read amplifier, a discussion of the noise problem is in order. In coincident current stores the signal-to-noise ratio can be as poor as 2:1. This is caused by the fact that in each plane one full row of X and a full row of Y cores receive half-select current pulses. For a plane of 64 x 64, 128 cores give zero disturbed (8–10 mv.) pulses and only the selected core gives a full-select (50 mv.) signal. Fortunately, the disturbed signals occur at the beginning of the full-select output and strobing techniques can be used to minimize the problem. The two signals are shown in FIG. 17.

A strobe is used to sample the "1" signal as shown. A winding scheme to provide noise cancellation is also used in coincident current systems. By these techniques, a 2:1 signal-to-noise ratio can be tolerated, but the noise cancellation winding method means that the reading amplifier must accept signals of both polarities.

In a linear select system many of these problems are avoided. Only one core on an X line receives read current from the Y driver. The current circulating in the X line at read time is very small (the terminating impedance of the line is nominally 300 ohms; at 50 mv. for a "1" signal, the current is therefore only 170 μa.). This current is far too small to excite back EMF. from the other cores on the X line. It is only necessary to cancel the noise from the wire inductance by folding the X line, as shown in FIG. 19, to achieve better than 10:1 signal-to-noise ratios.

The read amplifier need not accept bipolar input signals and the strobe technique is not essential.

The requirements of the read amplifier may now be set forth as follows:

(1) Uni-polar input.
(2) Discrimination against the write pulse flyback spike.
(3) DC coupling to avoid shifts in bias due to condenser charging time-constants under rapid recycling.
(4) Minimum number of stages.

The low output from the cores used in the system (50 mv. from an .05" O.D. core used for ease of driving with transistors) is difficult to handle in a purely digital circuit. To switch a silicon transistor into conduction, the threshold potential must be overcome (0.7 volt). A transformation from 50 mv. to 0.7 volt imposes great difficulties. The turns ratio of 1:12 gives nearly 240 secondary turns, the distributed capacity of which greatly attenuates the 2μs. signal. The practical limit appears to be 1:6, giving about 200 mv. at the secondary. This does not exceed the barrier potential of itself so some type of prebias must be used. Therefore, the input transistor is biased into conduction (Class A) during the reading cycle only, and the "1" signal is superimposed upon the bias, as shown in FIG. 11, in a manner similar to that described in the article by Frank F. Tsui in IRE Computer Transactions, October 1962, page 677.

Input A is connected to a gating amplifier and the pulse appears about 1 μs. before the input from the matrix line. Point B is allowed to rise until it is clamped by diodes D10, D11 and the voltage drop across W10 and D11 is sufficient to bias the transistor into conduction. The amount of conduction is determined by the emitter resistor R7. A conduction pedestal is thereby formed, and superimposed upon this pedestal is the signal from the matrix line (FIG. 18).

The pedestal is biased out in the subsequent DC amplifier stage, leaving the matrix signal to be amplified and used to set the following data register flip-flop. The complete read amplifier circuit is shown in FIG. 12.

Two transistor input stages are used, one for each group of 2560 cores in the compound X line. Experimentation has shown that attenuation of the "1" signal in passing through the series impedance of 4,000 cores becomes sufficient to reduce the signal-to-noise ratio to 4:1. Therefore, this gives a further reason, besides the driving problem discussed earlier, for segmenting the X line.

At all other times, except during the read interval, the absence of the gate pulse ensures that the reading amplifier will not respond to noise up to 6 volts in amplitude. As "post write disturb" noise is clamped to about 3 volts, the writing noises therefore do not enter the amplifier.

The 500 pf. condenser C2 connected between the gate input and ground slows the rise of the pedestal by about ½ μs., to minimize overshoot ringing of the pedestal and to provide a measure of insensitivity to the "0" disturbed signal which need is discussed in the Tsui article, although the implementation is not the same.

Operation of the complete linear select magnetic memory system under control of the external logic in accordance with the invention will now be described for the non-destructive mode and destructive mode of operation, respectively, in connection with the block diagram of FIG. 1.

In FIG. 1, the core matrix shown by the box labeled CM, comprising a 24-plane stack of memory planes of 25 X lines and 128 Y lines each (6144 magnetic cores) is as shown in FIG. 2 and described above. Each bidirectional switch represented by the boxes labeled BDS has a circuit such as illustrated in FIG. 5. The triggered bipolar multivibrator pulse generator represented by the box labeled BPG has a schematic circuit as shown in FIG. 7. Each X driver indicated by the boxes labeled XD and the input AND gates thereof represented by the boxes labeled AG have schematic circuits such as shown in FIG. 8. The emitter follower represented by the box labeled EF has a schematic circuit such as shown in FIG. 9. Each read amplifier connected to the various X lines, represented by the boxes labeled RA, and the associated OR gates OG have a schematic circuit such as shown in FIG. 12. The connections between each X line of the core matrix CM and associated X driver and read amplifier RA are shown schematically in FIG. 10. The functions of the other apparatus in FIG. 1, such as the memory sub-clock, delay circuits, AND and OR gates and flip-flop devices, illustrated by other labeled boxes, which may be of any of the types well known in the art, will be pointed out in connection with the following complete description of operation.

*Non-destructive mode*

It is assumed that the flip-flops FF and the associated gating systems in the address registers AR and BR have been set from the external logic to operate the top and bottom bi-directional switches BDS so as to select a particular Y line.

The binary word information to be written in the memory is held in the data register DR. Switches SW1 through SW4 at input from external logic are the setting devices for each data register flip-flop. Momentary closure of SW1 connected to FF1, SW3 connected to FF3, and SW4 connected to FF4 will set the code 1011 into the register. This code is transferred into the core memory as described under Destructive Mode.

An external trigger pulse is applied to the memory clocking device (Sub-Clock 1) from the external logic derived from the particular computer associated with this memory system. The device 1 will then emit a "start pulse" one input of which is applied directly to the input AND gating device 6, the other input of which is associated with the rewrite portion of the "rewrite-write new" control flip-flop 7. After a 1.5 μs. delay time provided by the delay circuit 2, the start pulse will trigger the pulse generator 3 (PG1) to emit a 7 microsecond pulse which will be transmitted to enable the selected bi-directional switches BDS at the top and bottom of the Y lines through the associated AND gates AG. One-half microsecond after the start of the 7 microsecond pulse the start pulse through the 2 μs. delay circuit 4 will cause the bipolar multivibrator pulse generator BPG to be triggered to send out a 2 μs. read pulse >500 ma. having a certain polarity through the selected BDS set, and all cores in the selected Y line will receive 1+ unit of read current.

From the cores in the selected Y line which had been in the "1" condition, a 50 mv. pulse will be propagated along each associated X line and will arrive at the input of the associated read amplifier RA. The amplified output of this read amplifier RA through its associated OR gate OG will set the corresponding flip-flop FF in the data register DR if a "1" had been stored in the core, the setting of the data flip-flop FF occurring at about 3 μs. in the read cycle. From the output of the data register DR, an enable signal will be sent to one of the inputs of the AND gate AG associated with the driver XD on the same X line.

At approximately 5 μs. in the cycle (or 2 μs. after the data register flip-flop FF is set), the start pulse through the 5 μs. delay circuit 5 will cause the bipolar pulse generator BPG to be triggered to transmit a bipolar mv. write pulse of opposite polarity from the read pulse, from the associated write source containing the binary information bits to be stored in the core matrix CM. This pulse will be transmitted through the emitter follower EF to enable the second input of the AND gate AG to the X driver XD in the selected X line. The resultant operation of that driver will cause the ½ write signal to appear in the selected X line as well as in the addressed Y line is still enabled to pass current because the input 7 μs. pulse generator PG1 is still conducting. The information bit is thereby caused to be written back into the selected core of the core matrix CM. As shown, the data register DR output may also be enabled in parallel for use in logic manipulations in the associated computer.

Each register flip-flop output feeds a gate (not shown) which is sampled and the binary information in the register is thereupon entered into the computer's processes. This process is likewise outside the scope of this application, but is treated in standard texts, such as "Digital Computor and Control Engineering" by Ledley.

*Destructive mode*

When new binary information is to be put into the memory core matrix CM, the information bits stored in the given Y address by a previous writing operation must first be destroyed. In the destructive mode, each of the reading amplifiers RA associated with the X lines of the matrix is normally disabled during the writing operation by means of the "write new" flip-flop 7 causing gate 6 to be shut against the memory sub-clock pulse. Thus, the 3μs. gate 8 is not enabled so that although the 1+ read current pulse on the Y line can cause "1" voltage on the X line, the reading amplifiers RA connected thereto are unable to respond, and no setting signal reaches the data register DR to disturb the setting of the register.

It is assumed the new information had been placed in the data register DR from the computer associated with this memory storage. As this information is not altered by the output of the core matrix CM, it is now in condition to be put into the storage on the subsequent write cycle. Therefore, destroying the stored information is accomplished by inhibiting the gate 6. If it is not desired to put any new information back into the store, the data register DR can be cleared by the reset input and the gate 6 inhibited so that nothing will be written in the Y address. Thus, it is seen that entrance and exit from the core memory are through the data register DR acting in concert with the rewrite-write new flip-flop 7. The read pulse starts the sequence, transferring the memory bits out to the data register, in the non-destructive mode or wiping it out in the destructive mode. The write cycle follows to either reinsert the same bit in the non-destructive mode, or insert new information in the destructive mode.

*Y line gating*

Figure 1A:
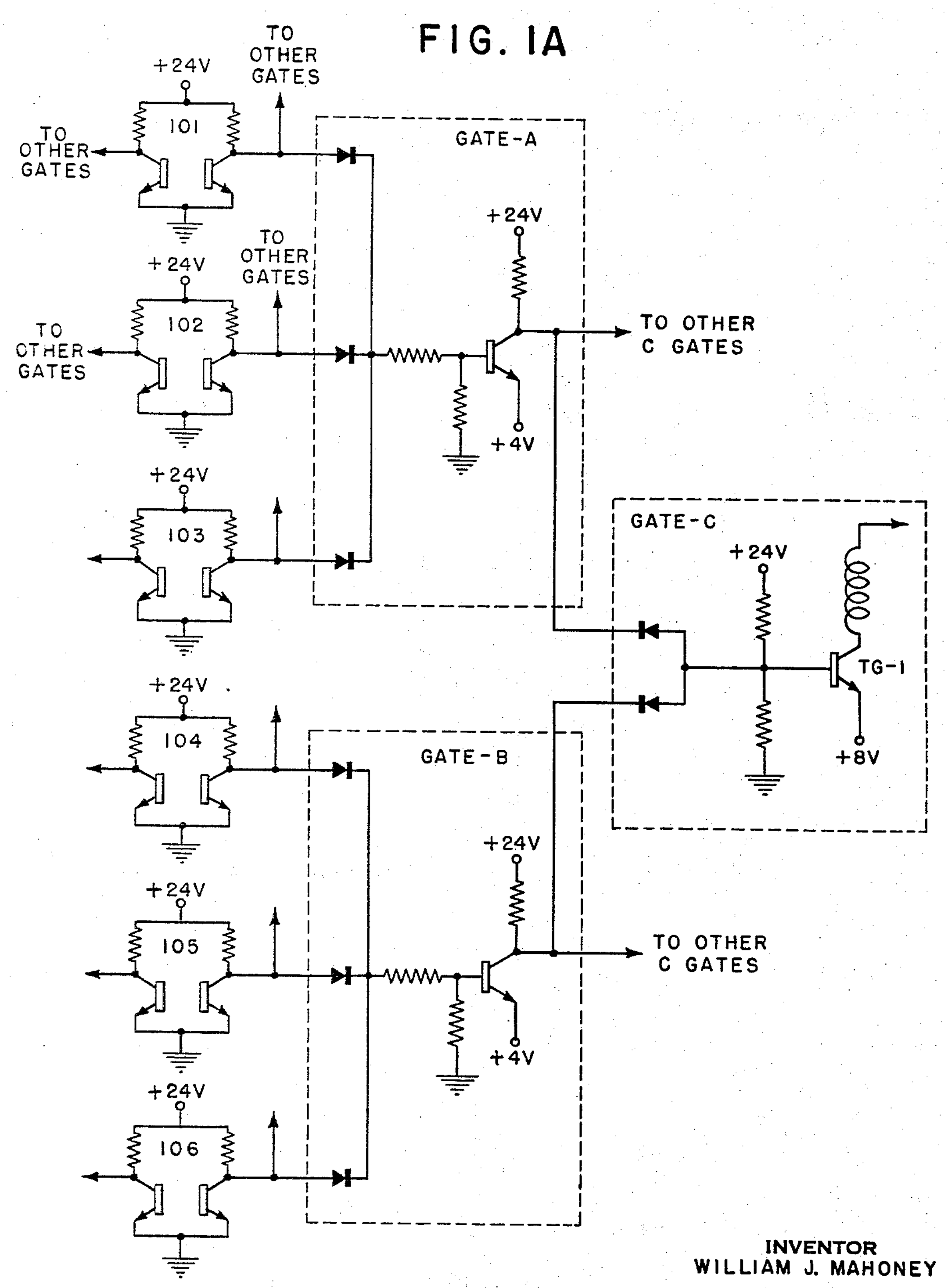
FIG. 1A shows schematically a portion of the Y line gating system of FIG. 1.

The method of selecting the appropriate L line through a top BDS (gating for a bottom BDS is accomplished in an identical manner) is as follows:

Referring to FIG. 1A, the six flip-flops 101, 102, 103, 104, 105, 106 are the units shown in FIG. 1. Gate A is one of the gates in the 8 gate assembly of FIG. 1; gate B is one of the gates in the 6 gate assembly; and gate C is one of the gates in the 48 gate assembly. In FIG. 1 the AND gate at the entrance to the BDS is not a diode gate, but the transistor gate TG2 of FIG. 5. Gates A and B are three-input negative AND gates. If the sides of the flip-flops connected to these gates are conducting (near ground), then the gate transistor will be non-conducting, the collector being at +24 volts. The transistors in gates A and B are the inputs to the gate C, a two-input gate. If both inputs to gate C are positive, the transistor of gate C is conducting. (In this case, this transistor is only conditioned to conduct, as no collector potential is yet available.) All the gates described except the BDS operate as DC gates.

From the above descriptions, it will be seen that conditioning of the BDS will occur if the appropriate sides of the three flip-flops connected to gates A and B are at ground, thereby causing the transistor in gates A and B to be at cutoff. With both of these transistors having their collectors at positive potential, gate C will have its transistor conditioned to conduct the power pulse from the 7 microsecond generator PG1 from collector to emitter, through the pulse transformer. This pulse is transformed into base drive for the power switch transistor in the diode bridge, which conditions the bridge to pass the output of the bipolar multivibrator BPG down the core line.

The addressing system may be set up anywhere from a few microseconds to minutes before the bipolar generator BPG is commanded, depending upon the requirements of the associated computer.

Various modifications of the circuits of the invention as illustrated and described within the spirit and scope of the invention will occur to persons skilled in the art.

What is claimed is:

1. A linear selection magnetic memory write-read system including in combination with a two-dimensional matrix of magnetic cores each having two stable remanent magnetization states, only two conductors in the core plane for writing binary word information into the matrix for storage therein and for reading the stored information out of the matrix, one of said conductors being a time-shared read-write conductor threaded through all the cores in each plane to which the read signal and binary word information is supplied at different times and the other conductor being threaded through all of the cores in another plane through which the read signal is applied to said one of said conductors, amplifier means for sensing the signal generated by a selected core in said one of said conductors when driven to one of the states of magnetization by the applied read signal and means in the connections of the amplifier means to said one of said conductors for reducing the adverse effect of the write signal on the amplifier means during the read operation including prebiased diode means for limiting the voltage applied to the input of said amplifier means to a predetermined low value during the write cycle and an input transformer for said amplifier means having a predetermined primary inductance, wherein the input transformer provides only sufficient primary inductance to support the signal generated by a selected core in said one of said conductors in response to the read signal applied thereto, and minimizes the amplitude and duration of the flyback voltage produced by the stored energy of both the cores in said one of said conductors and said transformer at the cessation of the write pulse.

2. The system of claim 1, in which one diode is connected across the primary of said input transformer to clamp the flyback voltage from the core line at a value less than approximately one volt and a clamp consisting of a second diode and a resistor in series therewith connected across the transformer secondary and of such values as to hold the transformed flyback voltage to less than about 3 volts, a value that at the time of writing is insufficient to cause conduction in the reading amplifier means, and said input transformer being such as to prevent the large spike occurring at the end of the write current from causing insensitivity to an immediately recurring read-write cycle and to allow the transformer to recover its sensitivity in a few microseconds.

3. A linear selection memory write-read system including in combination with a two-dimensional matrix of magnetic cores each having two stable remanent magnetization states, the magnetic cores in said matrix being arranged in rows and columns, which may be referred to as X and Y plane lines, respectively, a first conductor threaded through all the cores in each of said X lines operating as common driving winding therefor, a second conductor threaded through all cores in each of the Y lines and operating as common driving winding therefor, individual core driving means connected to the X driving winding, individual core driving means connected to the Y driving winding, a plurality of delay circuits of different delay values, means controlled by external logic through certain of said delay circuits to generate a full read pulse which is applied to the core driving means of a selected Y line, followed after a given time interval by a one-half write pulse representing one bit in the binary word information applied to said matrix, the one-half write pulse being applied to one input of the core driving means of the selected X line, individual read amplifier means connected to the output of each X line for sensing a change of state of magnetization of a selected core therein in response to the applied read pulse, means in the input of each amplifier means to prevent false operation thereof by the write pulse during read operation of the system, a data register including a flip-flop device associated with each of said X lines controlled by the output of the amplifier means therein, and an address register including gating means under control of the external logic.

4. The system of claim 3, in which the read amplifier output sets the data register flip-flop device if a "1" signal had been stored in the selected core, so that it applies an enable signal to another input of the core driving means connected to the same X line to cause the one-half write signal to appear on the selected X line as well as on the addressed Y line, whereby the information bit represented thereby is written back into the selected core in the X line.

5. The system of claim 3, in which the selection of the Y line is made by bi-directional switches at the top and bottom of the Y lines under control of gating means in the address register set from the external logic, the number of said switches being determined by the number of magnetic cores in said matrix which in turn is dependent upon the number of words to be written therein, one top switch being employed for each plane of a number of lines and a bottom switch for each line, and the memory can be expanded by use of only one additional top switch for every plane of a large number of Y lines.

6. The system of claim 3, in which the means controlled by external logic to generate read and write pulses is a bipolar pulse generator comprising a magnetic monostable transistor multivibrator both sides of which are triggered through said delay circuits to produce a full-read pulse followed after a given time interval with a one-half write pulse of opposite polarity, said generator employing a square loop core to achieve timing and to minimize the flyback effect when the current pulse terminates at the end of each half cycle of operation.

7. The system of claim 6, in which the output of said bipolar pulse generator is connected through top and bottom bi-directional switches across the cores in each of the Y lines.

8. The system of claim 6, in which stabistor diodes for providing a bias threshold and associated integrating swamping capacitors are used to prevent the free-running of the multivibrator.

9. The system of claim 3, in which each X line driver is a saturated transistor switch including one output transistor for each array of about 2560 magnetic cores in the matrix, the load of which is constant providing one selected core and $(n-1)$ half selected cores, where $n$ is the total number of cores on the X line, and for an impressed voltage of approximately 24 volts with a series resistance which limits the one-half write current *after* the unselected back-electromagnetic force ceases, the one selected core will be switched to one of its stable states, provided the drive current time exceeds both the selected and unselected switching times together.

10. A linear selection magnetic memory write-read system for non-destructive reading, comprising in combination with a two-dimensional matrix of magnetic cores each having two remanent magnetization states, arranged in intersecting rows and columns, which respectively may be referred to as X and Y plane lines, with an individual first conductor threading all the cores in each X line and operating as a common driving winding therefor, and an individual second conductor threading all the cores in each Y line and operating as a common driving winding therefor, individual driver means for the cores in each X line connected to said first conductor thereof, individual read amplifier means fed from the first conductor in each X line, switching means which is selected to select a particular Y line, means responsive to external logic for enabling the selected switching means and for generating a full read pulse followed by a half-write pulse of opposite polarity after a given time interval representing one information bit in a word, means for sending the read pulse through the selected switching means and all cores in the selected Y line, and the half-write pulse when it is generated to one input of the X line driver means, a data register including a flip-flop associated with each X line, the cores in the selected Y line which had been in one of said states in response to the applied read pulse, causing another pulse to be propagated down its X line through its read amplifier to set the corresponding data register flip-flop so that it applies an enable signal to the other input of the driver on the same X line to complete its operation thus causing the ½ write signal to appear on the selected X line as well as on the addressed Y line, whereby the information bit is rewritten back into the selected core.

11. The system of claim 10, modified to allow destruction of information bits stored in the given Y address of the memory matrix before new information is written therein, the modifications including a gate with a given amount of delay which is operated from the external logic to hold the amplifier means in the X lines of the matrix disabled during the process of writing binary word information therein, so that although a read pulse on a Y line can cause a core therein to generate a "1" signal on an X line, the reading amplifier means in that line is unable to respond and no setting signal reaches said data register to disturb the setting of the register, a second flip-flop means having a rewrite portion responsive to rewrite signals with a given delay to inhibit said gate before the read cycle and another portion responsive to "write new" signals, so that when new information has been put into the data register through said first flip-flop means from the external logic the new information is not altered by the matrix output, and is now in condition to be stored in the cores of the matrix on the subsequent write cycle, the destruction of the stored information being accomplished by inhibiting said gate, and if it is not desired to put any new information back into the matrix, the data registers can be cleared by a reset input to the flip-flop means therein and the gate inhibited so that no information will be written into the Y address.

12. The system of claim 6, in which a diode shunted by a first resistor, and a second resistor in series therewith, is inserted in series with the output winding of the bi-polar pulse generator, and the bipolar pulse generator when triggered by the external logic will produce a square output pulse of a certain polarity in the output winding so that the full output voltage (less the voltage drop of said diode), which is the full read current, will appear across the second resistor and through the top and bottom bi-directional switches across the cores in the selected Y line, and when the bipolar pulse generator is later triggered by the external logic, said generator will produce a square output pulse of the opposite polarity in the output winding and said diode is back biased thereby and the output current is limited by both said first and second resistor in series, which is one-half write current, and travels through the enabled bi-directional switches on the selected Y line.

13. The system of claim 3, in which only the core on an X line receives one-half read current from the Y driver means so that the current circulating in the X line at read time is very small and too small to excite back electromotive force from the other non-selected cores in the X line, and the X line is folded so as to cancel the noise from the wire inductance, and thus to achieve better than 10:1 signal-to-noise ratios.

References Cited

UNITED STATES PATENTS

| | | | |
|---|---|---|---|
| 3,000,004 | 9/1961 | Weller | 340—174 |
| 3,105,226 | 9/1963 | Bobeck | 340—174 |
| 3,105,962 | 10/1963 | Bobeck | 340—174 |
| 3,115,619 | 12/1963 | Barrett et al. | 340—174 |
| 3,360,786 | 12/1967 | Steele et al. | 340—174 |

STANLEY M. URYNOWICZ, Jr., *Primary Examiner.*